United States Patent
Yamaguchi et al.

(10) Patent No.: US 11,520,837 B2
(45) Date of Patent: Dec. 6, 2022

(54) CLUSTERING DEVICE, METHOD AND PROGRAM

(71) Applicant: NIPPON TELEGRAPH AND TELEPHONE CORPORATION, Tokyo (JP)

(72) Inventors: Masataka Yamaguchi, Tokyo (JP); Go Irie, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 20 days.

(21) Appl. No.: 17/263,110

(22) PCT Filed: Jul. 26, 2019

(86) PCT No.: PCT/JP2019/029495
§ 371 (c)(1),
(2) Date: Jan. 25, 2021

(87) PCT Pub. No.: WO2020/022498
PCT Pub. Date: Jan. 30, 2020

(65) Prior Publication Data
US 2021/0303629 A1 Sep. 30, 2021

(30) Foreign Application Priority Data
Jul. 26, 2018 (JP) .............................. JP2018-140532

(51) Int. Cl.
*G06F 16/906* (2019.01)
(52) U.S. Cl.
CPC ................................. *G06F 16/906* (2019.01)

(58) Field of Classification Search
CPC .................................................... G06F 16/906
See application file for complete search history.

(56) References Cited

U.S. PATENT DOCUMENTS

| | | | | |
|---|---|---|---|---|
| 2014/0222953 A1* | 8/2014 | Karve | ..................... | G06F 9/455 709/217 |
| 2014/0365132 A1* | 12/2014 | Imhof | ................... | G06V 20/653 702/14 |
| 2016/0267173 A1* | 9/2016 | Noma | ..................... | G06F 16/35 |

OTHER PUBLICATIONS

Lu et al. (2012) "Robust and Efficient Subspace Segmentation via Least Squares Regression" Proceedings of the 12th European conference on Computer Vision—vol. Part VII, 7578, 347-360, DOI: 10.1007/978-3-642-33786-4_26.

\* cited by examiner

*Primary Examiner* — Baoquoc N To

(57) ABSTRACT

Clustering can be performed using a self-expression matrix in which noise is suppressed. A self-expression matrix is calculated that minimizes an objective function that is for obtaining, from among matrices included in a predetermined matrix set, a self-expression matrix whose elements are linear weights when data points in a data set are expressed by linear combinations of points, the objective function being represented by a term for obtaining the residual between data points in the data set and data points expressed by linear combinations of points using the self-expression matrix, a first regularization term that is multiplied by a predetermined weight and is for reducing linear weights of the data points that have a large Euclidean norm in the self-expression matrix, and a second regularization term for the self-expression matrix. A similarity matrix defined by the calculated self-expression matrix is then calculated. Then a clustering result is obtained by clustering the data set based on the similarity matrix.

20 Claims, 7 Drawing Sheets

CLUSTERING DEVICE, METHOD AND PROGRAM

CROSS-REFERENCE TO RELATED APPLICATIONS

This application is a U.S. 371 Application of International Patent Application No. PCT/JP2019/029495, filed on 26 Jul. 2019, which application claims priority to and the benefit of JP Application No. 2018-140532, filed on 26 Jul. 2018, the disclosures of which are hereby incorporated herein by reference in their entireties.

TECHNICAL FIELD

The present invention relates to a clustering device, method, and program, and in particular relates to a clustering device, method, and program for clustering data sets.

BACKGROUND ART

There is technology related to a method for classifying digital signals such as image signals and acoustic signals including audio and music signals. There are situations where a set of data points can be regarded as belonging to a set of subspaces. The problem of classifying such a set of data points into data points in the same subspace is called subspace clustering. FIG. 1 is a conceptual diagram of subspace clustering. Subspace clustering is an important problem used in image clustering and data mining.

The data set shown on the left in FIG. 1 is clustered correctly if the points on the left diagonal line are put in the same cluster, the points on the right diagonal line are put in the same cluster, and the points on the plane are put in the same cluster, as shown on the right in FIG. 1.

Various frameworks have conventionally been proposed for subspace clustering, and in particular, a framework based on spectral clustering is regarded as promising from the viewpoint of ease of usage and accuracy. Spectral clustering-based subspace clustering is a framework made up of two steps. First, a similarity matrix is created using parameters according to which points that belong to the same subspace have a higher similarity (see FIG. 2), and next, clustering is performed through spectral clustering based on the obtained similarity matrix.

Here, consider how similarity calculation is to be performed in the first step for creating a similarity matrix. Let the similarity matrix be $M \in R^{N \times N}$, and let $M_{ij}$ store the similarity between the i-th data point and the j-th data point. Similarity calculation can be performed by employing a method in which the similarity is as high as possible between data points that belong to the same subspace, and the similarity is zero or as low as possible between points that belong to different subspaces. Various similarity defining methods have been proposed, but the so-called self-expression approach has been the mainstream in recent years, and the following describes a technique that is based on this self-expression approach.

The self-expression approach is an approach that is based on the idea that "each data point can be expressed by a linear combination of a small number of points that belong to the same subspace". For example, consider one circled point in FIG. 3. If this point is to be reconstructed with a linear combination of as few other points as possible, it could be expressed using only two circled points that belong to the same subspace, for example. In this way, when attempting to reconstruct a point by a linear combination of as few points as possible, only points belonging to the same subspace as that point are selected and used for linear combination. The usage of this characteristic to perform similarity calculation is the self-expression approach.

The following is a more detailed description of the self-expression approach. In the self-expression approach, first, the objective function of Formula (1) below is solved.

[Formula 1]

$$Z = \mathrm{argmin}_{Z \in C} h(X-XZ) + \lambda r(Z) \quad (1)$$

Here, $X \in R^{D \times N}$ is a data matrix whose elements are the data points in the data set. $Z \in R^{N \times N}$ is a matrix corresponding to the weights of the linear combinations, and is called a self-expression matrix. The elements of the self-expression matrix are the linear weights when the data points in the data set are each expressed as a linear combination of points. X−XZ is the residual when X is expressed by the linear combination XZ of X, and h(X−XZ) is a term that penalizes the residual. r(Z) is a regularization term for using as few points as possible when expressing each point of X by a linear combination of other points. In other words, it is a term that encourages as many elements of Z as possible to be zero. λ is a parameter for balancing the two terms. C is the conditional set of matrices of Z.

In the self-expression approach, the self-expression matrix Z is calculated, and then the similarity matrix M is calculated based on the obtained Z. As one representative method of defining the similarity matrix, M is defined by setting $M_{ij} = |Z_{ij}| + |Z_{ji}|$. Then, a clustering result is obtained by performing classifying using an algorithm for graph clustering, such as spectral clustering, using the calculated similarity matrix M. FIG. 4 shows an example of the flow of the self-expression approach.

In Formula (1), the technique in NPL 1 proposes the use of $h(X-XZ) = \|X-XZ\|^2_F$ and $r(Z) = \|Z\|^2_F$, and the use of $C = R^{N \times N}$ or $C = \{Z | Z \in R^{N \times N}, Z_{ii} = 0\}$ as the conditional set C. Since there is a closed solution in Z regardless of which matrix set C is used, Formula (1) can be calculated at high speed.

CITATION LIST

Non Patent Literature

[NPL 1] Can-Yi Lu, Hai Min, Zhong-Qiu Zhao Lin Zhu, De-Shuang Huang, and Shuicheng Yan. "Robust and Efficient Subspace Segmentation via Least Squares Regression", ECCV2012

SUMMARY OF THE INVENTION

Technical Problem

In conventional technology, reconstruction is performed using all other data as candidates for linear combination. Real-world data sets are thought to often contain data with large disturbances (e.g., spike noise and data of completely different categories). For this reason, if all of the data in a data set is taken into consideration during reconstruction, all of the data with large disturbances is also taken into consideration, and the results may be adversely affected by such data. For example, in the data set generated from a one-dimensional subspace as shown in (a) of FIG. 5, consider the case where the circled data in (a) is expressed by a linear combination of other points. If all of the points are used as candidates for linear combination, the circled data could be represented using data points that are slightly out of the one-dimensional subspace as shown in (b) of FIG. 5. In such a case, there is a risk of erroneously determining that there is also a one-dimensional subspace in the dotted line portion in (b) of FIG. 5(b).

The present invention was achieved in order to solve the foregoing problems, and an object of the present invention is to provide a clustering device, method, and program that can perform clustering with use of a self-expression matrix in which the influence of noise is suppressed.

Means for Solving the Problem

In order to achieve the aforementioned object, a clustering device according to a first aspect of the invention includes: a self-expression matrix calculation unit configured to calculate a self-expression matrix that minimizes an objective function that is for obtaining, from among matrices included in a predetermined matrix set, a self-expression matrix whose elements are linear weights when data points in a data set are expressed by linear combinations of points, the objective function being represented by a term for obtaining a residual between data points in the data set and data points expressed by linear combinations of points using the self-expression matrix, a first regularization term that is multiplied by a predetermined weight and is for reducing linear weights of the data points that have a large Euclidean norm in the self-expression matrix, and a second regularization term for the self-expression matrix; a similarity calculation unit configured to calculate a similarity matrix defined by the self-expression matrix that was calculated; and a clustering unit configured to obtain a clustering result by clustering the data set based on the similarity matrix.

A clustering method according to a second aspect of the invention includes the steps of: calculating, by a self-expression matrix calculation unit, a self-expression matrix that minimizes an objective function that is for obtaining, from among matrices included in a predetermined matrix set, a self-expression matrix whose elements are linear weights when data points in a data set are expressed by linear combinations of points, the objective function being represented by a term for obtaining a residual between data points in the data set and data points expressed by linear combinations of points using the self-expression matrix, a first regularization term that is multiplied by a predetermined weight and is for reducing linear weights of the data points that have a large Euclidean norm in the self-expression matrix, and a second regularization term for the self-expression matrix; calculating, by a similarity calculation unit, a similarity matrix defined by the self-expression matrix that was calculated; and obtaining, by a clustering unit, a clustering result by clustering the data set based on the similarity matrix.

A program according to a third aspect of the invention is a program for causing a computer to function as the units of the clustering device according to the first aspect of the invention.

Effects of the Invention

According to the clustering device, the method, and the program of the present invention, a self-expression matrix is calculated that minimizes an objective function that is for obtaining, from among matrices included in a predetermined matrix set, a self-expression matrix whose elements are linear weights when data points in a data set are expressed by linear combinations of points, the objective function being represented by a term for obtaining the residual between data points in the data set and data points expressed by linear combinations of points using the self-expression matrix, a first regularization term that is multiplied by a predetermined weight and is for reducing linear weights of the data points that have a large Euclidean norm in the self-expression matrix, and a second regularization term for the self-expression matrix. A similarity matrix defined by the calculated self-expression matrix is then calculated. Then a clustering result is obtained by clustering the data set based on the similarity matrix. This obtains an effect of being able to perform clustering with use of a self-expression matrix in which noise is suppressed.

DESCRIPTION OF EMBODIMENTS

An embodiment of the present invention is described in detail below with reference to the drawings.

<Overview of Embodiment of Present Invention>

First, an overview of the embodiment of the present invention will be given.

Figure 1:
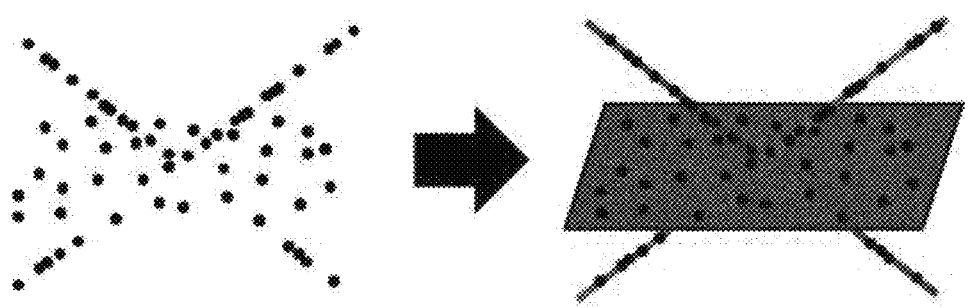
FIG. 1 is a diagram showing an example of the clustering of a data set.
Figure 2:
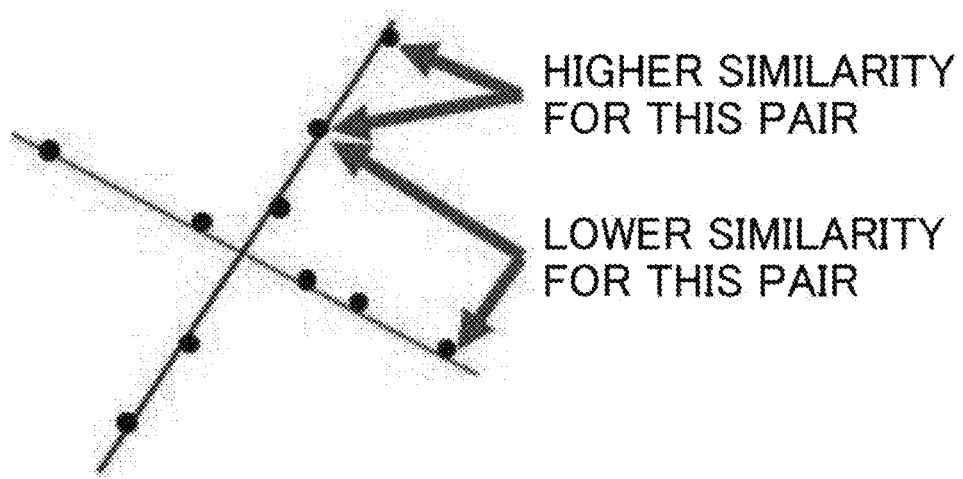
FIG. 2 is a conceptual diagram showing an example where the similarity is higher when points belong to the same subspace.
Figure 3:
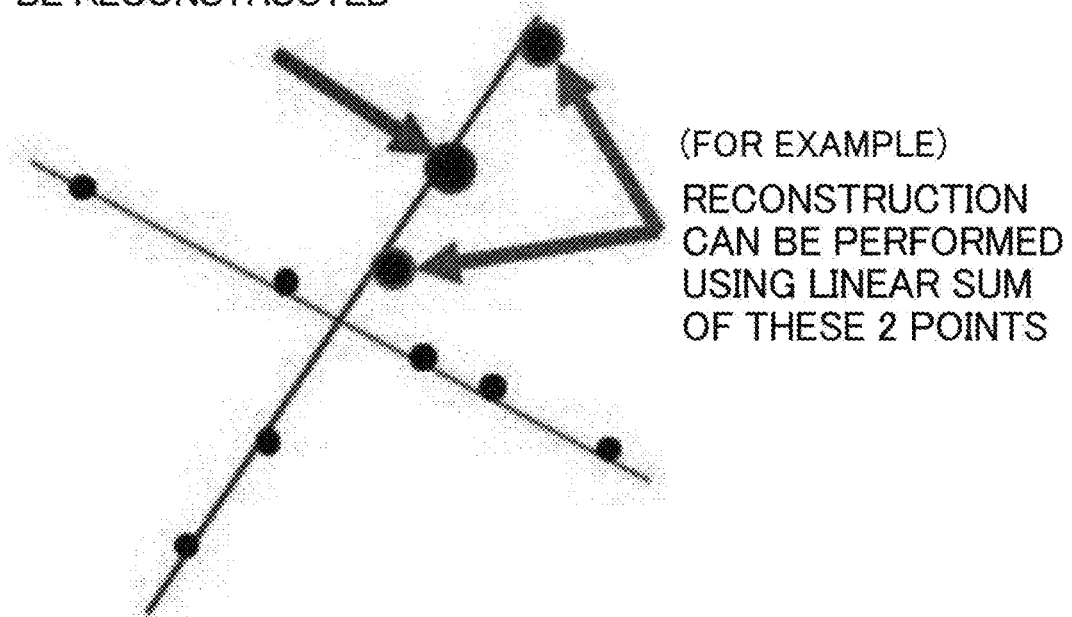
FIG. 3 is a conceptual diagram showing an example of the case of reconstructing a point by a linear combination of two points that belong to the same subspace.
Figure 4:
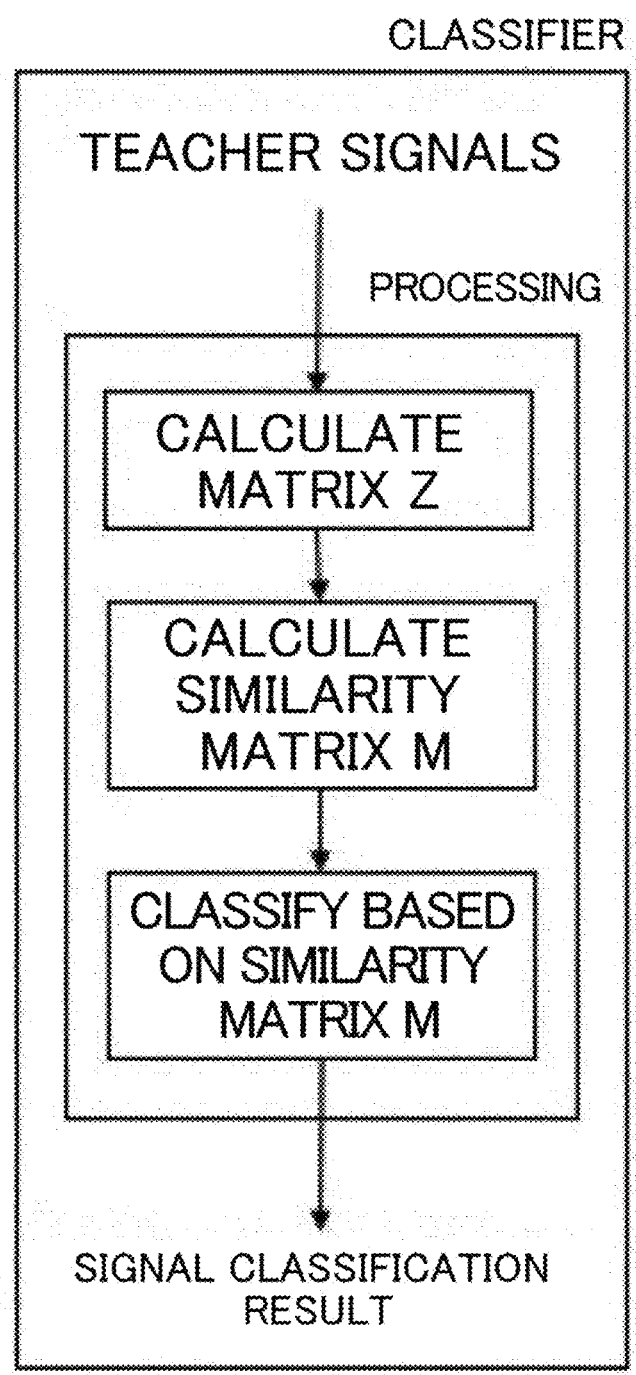
FIG. 4 is a diagram showing an example of the flow of the self-expression approach.
Figure 5:
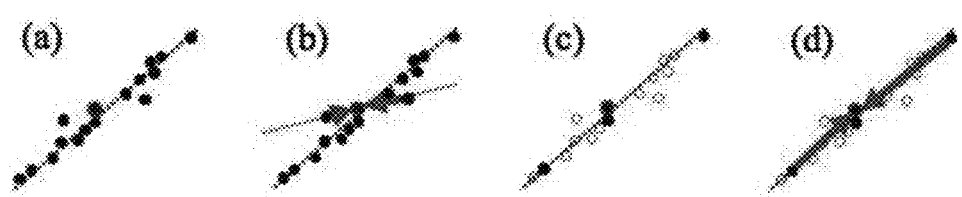
FIG. 5 is a conceptual diagram of the case of using linear combination expression for a data set in a subspace.

In order to solve the problems described above, consider a method of randomly sampling data from a data set, and then solving Formula (1) using the sampled data. This will be described based on the example in FIG. 5. In FIG. 5, (c) shows an example of the case where data was randomly sampled from the data in (a) of FIG. 5. If the number of very noisy data points is small compared to the non-noisy data, most of the noisy data can be ignored by performing random sampling, and it is possible to strengthen the tendency expressed by the data whose data points do not deviate much from the actual subspace. In FIG. 5, (d) shows an example that envisions the case where data points are represented by linear combination of points in the same subspace.

First, before describing the specific configuration of the embodiment of the present invention, the background of the idea of the technique of the embodiments of the present invention will be described. Hereinafter, consider the use of $h(X-XZ)=\|X-XZ\|^2_F$. First, data points are selected according to a Bernoulli distribution with the probability $\alpha \in (0,1)$, and when Formula (1) is redefined using only the selected data, Formula (2) below is obtained.

[Formula 2]

$$Z^* = \mathrm{argmin}_{Z \in C} \|F\|^2_F + \lambda r(Z), \text{ where } F = XP^T - XP^T PZP^T, \quad P \sim p(P) \qquad (2)$$

Here, $P \sim p(P)$ is a selection matrix that selects data points with the probability $\alpha$. If Formula (2) is used as it is, the portion of data corresponding to the data not selected by P is not selected. In view of this, consider taking an expected value for the F portion.

[Formula 3]

$$Z^* = \operatorname{argmin}_{Z \in C} E[\|F\|^2_F] + \lambda r(Z), \text{ where } F = XP^T - XP^T P Z P^T, P \sim p(P) \quad (3)$$

Furthermore, $E[\|F\|^2_F]$ can be transformed as follows.

[Formula 4]

$$E[\|F\|^2_F] = \alpha \|X - XZ'\|^2_F + (1-\alpha) \|\operatorname{Diag}(\operatorname{diag}(X^T X))^{0.5} Z'\|^2_F + 2(1-\alpha)\operatorname{trace}(X^T X)(Z'-I)\operatorname{Diag}(\operatorname{diag}(Z'))) + (2\alpha-1)(\alpha-1)/\alpha \operatorname{trace}(X^T X \operatorname{Diag}(\operatorname{diag}(Z'))2) \quad (4)$$

Here, $\operatorname{diag}(x)$ is an operator that returns a diagonal matrix with vector x as diagonal elements, $\operatorname{Diag}(X)$ is an operator that extracts only the diagonal elements of the square matrix X to a vector, and $\operatorname{trace}(X)$ is a trace operator (i.e., the sum of the diagonal elements). Also, $Z' = \alpha Z$.

Furthermore, if $C = \{Z | Z \in \mathbb{R}^{N \times N}, Z_{ii} = 0\}$ is selected as the matrix set C that is the condition of Z, then Formula (3) can be transformed as follows.

[Formula 5]

$$Z^* = \operatorname{argmin}_{Z \in C} \alpha \|X - XZ'\|^2_F + (1-\alpha) \|\operatorname{Diag}(\operatorname{diag}(X^T X))^{0.5} Z'\|^2_F + \lambda r(Z'/\alpha), \quad (5)$$

A new regularization term $\|\operatorname{Diag}(\operatorname{diag}(X^T X))^{0.5} Z'\|^2_F$ can be naturally derived from Formula (5). The elements of Z can be weighted by introducing this term. The configuration of the embodiment of the present invention will be described below based on the derivation by the above-described formula transformation.

<Configuration of Clustering Device According to Embodiment of Present Invention>

Figure 6:
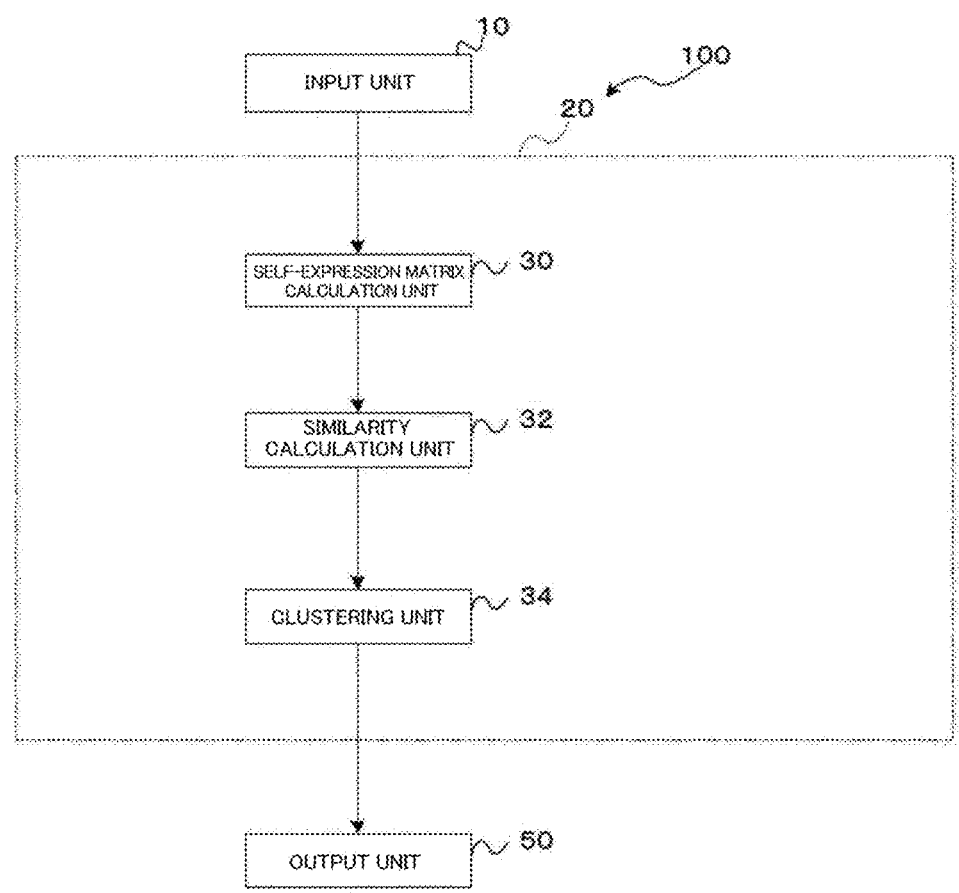
FIG. 6 is a block diagram showing a configuration of a clustering device according to an embodiment of the present invention.

The following describes the configuration of a clustering device according to an embodiment of the present invention. As shown in FIG. 6, a clustering device 100 according to this embodiment of the present invention can be configured by a computer including a CPU, a RAM, and a ROM storing a program for executing a clustering processing routine described below and various data. As shown in FIG. 6, as a function configuration, this clustering device 100 includes an input unit 10, an arithmetic operation unit 20, and an output unit 50.

The input unit 10 accepts a data set as a processing target.

The arithmetic operation unit 20 is configured by a self-expression matrix calculation unit 30, a similarity calculation unit 32, and a clustering unit 34.

The self-expression matrix calculation unit 30 calculates, for the accepted data set, a self-expression matrix that minimizes the objective function of Formula (6) below, from the predetermined matrix set C.

[Formula 6]

$$Z = \operatorname{argmin}_{Z \in C} h(X - XZ) + \beta \|\operatorname{Diag}(\operatorname{diag}(X^T X))^{0.5} Z\|^2_F + \lambda r(Z) \quad (6)$$

The objective function represented by Formula (6) is an objective function for obtaining, from the matrices included in the matrix set C, a self-expression matrix Z whose elements are linear weights when the data points in the data set are expressed by linear combinations of points. The objective function is represented by the following terms. $h(X-XZ)$ is a term for obtaining the residual between data points in the data matrix X whose elements are the data points in the data set, and data points expressed by linear combinations of points using the self-expression matrix Z. Also, $\|\operatorname{Diag}(\operatorname{diag}(X^T X))^{0.5} Z\|^2_F$ is a first regularization term for reducing the linear weights of the data points that have a large Euclidean norm in the self-expression matrix Z. The first regularization term is multiplied by a predetermined weight $\beta$. $r(Z)$ is a second regularization term for the self-expression matrix.

Note that $\lambda$ is a weight for the second regularization term, $\operatorname{diag}(x)$ is an operator that returns a diagonal matrix having the vector x as diagonal elements, and $\operatorname{Diag}(x)$ is an operator that extracts the diagonal elements of the matrix x to a vector. The first regularization term is expressed using the result of calculating a matrix by calculating the product of a transposed matrix of the data set and a matrix of the data set, calculating a vector by applying the operator $\operatorname{Diag}(x)$, which extracts the diagonal elements of a matrix to a vector, to the calculated matrix, and applying the operator $\operatorname{diag}(x)$, which returns a diagonal matrix having a vector as diagonal elements, to the calculated vector. C is $\mathbb{R}^{N \times N}$ or $\{Z | Z \in \mathbb{R}^{N \times N}, Z_{ii} = 0\}$, and $h(\bullet)$ is the q-th power of the following Lp norm.

[Formula 7]

$$h(\Lambda) = (\Sigma_i \Sigma_j |\Lambda_{ij}|^p)^{q/p}$$

p and q are a positive number.

Various options are possible for $r(Z)$ of the second regularization term. For example, it is conceivable to use nothing (i.e., $r(Z)=0$), the Frobenius norm $r(Z)=\|Z\|_F$, the Frobenius norm squared $r(Z)=\|Z\|^2_F$, or the L1 norm $r(Z)=\|Z\|_1$.

The similarity calculation unit 32 calculates the similarity matrix M defined by the self-expression matrix Z calculated by the self-expression matrix calculation unit 30. For example, a method of defining M as $M_{ij} = |Z_{ij}| + |Z_{ji}|$ can be used.

The clustering unit 34 obtains a clustering result by clustering the data set based on the similarity matrix M calculated by the similarity calculation unit 32. As the clustering method, for example, spectral clustering can be used, or a maximum cut method can be used.

<Effects of Clustering Device According to Embodiment of Present Invention>

Figure 7:
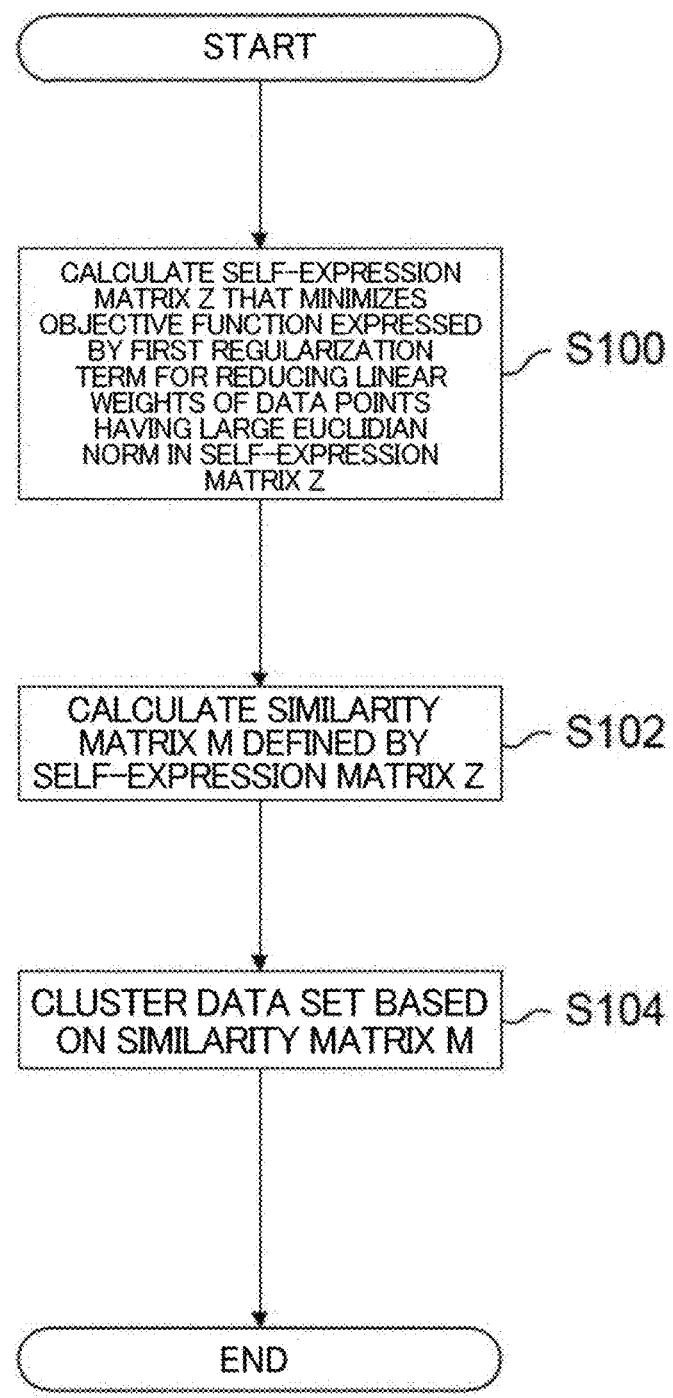
FIG. 7 is a flowchart showing a clustering processing routine in the clustering device according to the embodiment of the present invention.

The following describes effects of the clustering device 100 according to this embodiment of the present invention. When the input unit 10 accepts a data set that is a processing target, the clustering device 100 executes the clustering processing routine shown in FIG. 7.

First, in step S100, for the received data set, a self-expression matrix that minimizes the objective function of Formula (6) is calculated from the predetermined matrix set C. The objective function represented by Formula (6) is an objective function for obtaining, from the matrices included in the matrix set C, a self-expression matrix Z whose elements are linear weights when the data points in the data set are expressed by linear combinations of points. The objective function is represented by the following terms. $h(X-XZ)$ is a term for obtaining the residual between data points in the data matrix X whose elements are the data points in the data set, and data points expressed by linear combinations of points using the self-expression matrix Z. Also, $\|\operatorname{Diag}(\operatorname{diag}(X^T X))^{0.5} Z\|^2_F$ is the first regularization term for reducing the linear weights of the data points that have a large Euclidean norm in the self-expression matrix Z. The first regularization term is multiplied by the predetermined weight $\beta$. $r(Z)$ is the second regularization term for the self-expression matrix.

Next, in step S102, the similarity matrix M defined by the self-expression matrix Z calculated in step S100 is calculated.

In step S104, the clustering result of clustering the data set based on the similarity matrix M calculated in step S102 is output to the output unit 50, and then processing is ended.

As described above, according to the clustering device of this embodiment of the present invention, by obtaining a clustering result by clustering a data set based on a similarity matrix as described below, a data set can be clustered with use of a self-expression matrix in which the influence of noise is suppressed. Here, the self-expression matrix is a matrix whose elements are linear weights when the data points in the data set are expressed by linear combinations of points, from among the matrices included in the predetermined matrix set. The similarity matrix is defined by a self-expression matrix calculated by the procedure described below. The self-expression matrix is calculated so as to minimize the objective function of Formula (6) represented by the terms listed below. These terms include a term for obtaining the residual between data points in the data set and data points expressed by linear combinations of points using the self-expression matrix, a first regularization term that is multiplied by the predetermined weight β and is for reducing the linear weights of the data points that have a large Euclidean norm in the self-expression matrix, and a second regularization term for the self-expression matrix.

[Verification of Experimental Examples]

If the regularization term $\|Diag(diag(X^TX))^{0.5}Z\|^2_F$ in the proposed method of this embodiment is $h(X-XZ)=\|X-XZ\|^2_F$, it can be derived by applying random sampling. For this reason, this regularization term can be expected to have robustness with respect to noise. Also, when compared with the regularization term $\|Z\|^2_F$ used in existing research, the regularization term $\|Diag(diag(X^TX))^{0.5}Z\|^2_F$ is the result of weighting Z with $Diag(diag(X^TX))^{0.5}$, and as a result, it is possible to also expect an effect of preventing data points that have a large Euclidean norm from exerting an excessively large influence on the self-expression matrix.

In addition, high speed calculation is possible in specific cases. In particular, if "$h(X-XZ)=\|X-XZ\|^2_F$, r (Z)=0, $C=R^{N\times N}$", if "$h(X-XZ)=\|X-XZ\|^2_F$, r (Z)=0, $C=\{Z|Z\in R^{N\times N}, Z_{ii}=0\}$", if "$h(X-XZ)=\|X-XZ\|^2_F$, $r(Z)=\|Z\|^2_F$, $C=R^{N\times N}$", or if "$h(X-XZ)=\|X-XZ\|^2_F$, $r(Z)=\|Z\|^2_F$, $C=\{Z|Z\in R^{N\times N}, Z_{ii}=0\}$", there is a closed solution in Z, and Z can be calculated at high speed.

The following describes an experimental example that demonstrates that the technique of this embodiment has an experimentally excellent effect.

The effectiveness of this technique can be demonstrated through a clustering experiment using COIL100 or MNIST-RB, which are real-world data sets that are often used in subspace clustering research. COIL100 is a 32×32 image dataset for 100 categories of 72 images each. MNIST-RB is a data set with noise randomly added to the background of MNIST, which is a 28×28 handwritten numeral data set of numerals from 0 to 9. For fairness, half of each of COIL100 and MNIST-RB was used for validation for parameter adjustment and the other half was used for testing. In COIL100, 10 classes were randomly selected from each of the validation and test halves 20 times to obtain 20 evaluation sets. In MNIST-RB, 100 data pieces were randomly selected from each of the validation and test halves 20 times to obtain 20 evaluation sets. Also, the accuracy described in the following formula was used as an evaluation index.

accuracy=(number of correctly clustered points/total number of points)

Table 1 below shows the results when $h(X-XZ)=\|X-XZ\|^2_F$, $C=\{Z|Z\in R^{N\times N}, Z_{ii}=0\}$, r(Z)=0 when calculating the matrix Z. It can be seen that this technique has a higher accuracy than the conventional technique.

TABLE 1

|  | Accuracy (COIL100) | Accuracy (MNIST-RB) |
| --- | --- | --- |
| Conventional technique | 0.933 | 0.460 |
| Present technique | 0.916 | 0.507 |

Note that the present invention is not limited to the above-described embodiment, and various modifications and applications are possible without departing from the gist of the present invention.

REFERENCE SIGNS LIST

10 Input unit
20 Arithmetic operation unit
30 Self-expression matrix calculation unit
32 Similarity calculation unit
34 Clustering unit
50 Output unit
100 Clustering device

The invention claimed is:

1. A clustering device comprising a processor configured to execute a method comprising:
    generating a self-expression matrix that minimizes an objective function that is for obtaining, from among matrices included in a predetermined matrix set, a self-expression matrix whose elements are linear weights when data points in a data set are expressed by linear combinations of points,
    the objective function being represented by at least:
        a term for obtaining a residual between data points in the data set and data points expressed by linear combinations of points using the self-expression matrix,
        a first regularization term that is multiplied by a predetermined weight and is for reducing linear weights of the data points that have a large Euclidean norm in the self-expression matrix, and
        a second regularization term for the self-expression matrix;
    generating a similarity matrix defined by the generated self-expression matrix; and
    generating a clustering result by clustering the data set based on the similarity matrix.

2. The clustering device according to claim 1, wherein the first regularization term is expressed using a result of:
    obtaining a matrix by calculating a product of a transposed matrix of the data set and a matrix of the data set,
    obtaining a vector by applying an operator for extracting diagonal elements of a matrix to a vector to the obtained matrix, and
    applying an operator that returns a diagonal matrix having a vector as diagonal elements to the obtained vector.

3. The clustering device according to claim 1, the processor further configured to execute a method comprising:
    generating the self-expression matrix that minimizes the objective function of Formula (1) below, from a predetermined matrix set C,

[Formula 1]

$$Z=\operatorname{argmin}_{Z\in C} h(X-XZ)+\lambda r(Z) \quad (1)$$

where X is a data matrix whose elements are data points in the data set, Z is the self-expression matrix, $\beta$ is the predetermined weight applied to the first regularization term, $r(Z)$ is the second regularization term, $\lambda$ is a weight applied to the second regularization term, diag (x) is an operator that returns a diagonal matrix having a vector x as diagonal elements, Diag(x) is an operator that extracts diagonal elements of a matrix x to a vector, C is $R^{N \times N}$ or $\{Z | Z \varepsilon R^{N \times N}, Z_{ii}=0\}$, h(*) is the q-th power of Lp norm, and p and q are positive numbers.

4. A clustering method, the method comprising:
generating, by a self-expression matrix generator, a self-expression matrix that minimizes an objective function that is for obtaining, from among matrices included in a predetermined matrix set a self-expression matrix whose elements are linear weights when data points in a data set are expressed by linear combinations of points,
the objective function being represented by at least:
a term for obtaining a residual between data points in the data set and data points expressed by linear combinations of points using the self-expression matrix,
a first regularization term that is multiplied by a predetermined weight and is for reducing linear weights of the data points that have a large Euclidean norm in the self-expression matrix, and
a second regularization term for the self-expression matrix;
generating, by a similarity generator, a similarity matrix defined by the self-expression matrix that was calculated; and
generating, by a cluster generator, a clustering result by clustering the data set based on the similarity matrix.

5. The clustering method according to claim 4, wherein the first regularization term is expressed using a result of obtaining a matrix by calculating a product of a transposed matrix of the data set and a matrix of the data set, obtaining a vector by applying an operator for extracting diagonal elements of a matrix to a vector to the obtained matrix, and applying an operator that returns a diagonal matrix having a vector as diagonal elements to the obtained vector.

6. The clustering method according to claim 4, wherein the self-expression matrix generator generates the self-expression matrix that minimizes the objective function of Formula (3) below, from a predetermined matrix set C,

[Formula 2]

$$Z^* = \mathrm{argmin}_{Z \in C} \|F\|^2_F + \lambda r(Z), \ldots \quad (2)$$

where X is a data matrix whose elements are data points in the data set, Z is the self-expression matrix, $\beta$ is the predetermined weight applied to the first regularization term, $r(Z)$ is the second regularization term, $\lambda$ is a weight applied to the second regularization term, diag (x) is an operator that returns a diagonal matrix having a vector x as diagonal elements, Diag(x) is an operator that extracts diagonal elements of a matrix x to a vector, C is $R^{N \times N}$ or $\{Z | Z \varepsilon R^{N \times N}, Z_{ii}=0\}$, h(*) is the q-th power of Lp norm, and p and q are positive numbers.

7. A computer-readable non-transitory recording medium storing computer-executable program instructions that when executed by a processor causes a computer system to:
generate, by a self-expression matrix generator, a self-expression matrix that minimizes an objective function that is for obtaining, from among matrices included in a predetermined matrix set, a self-expression matrix whose elements are linear weights when data points in a data set are expressed by linear combinations of points,
the objective function being represented by at least:
a term for obtaining a residual between data points in the data set and data points expressed by linear combinations of points using the self-expression matrix,
a first regularization term that is multiplied by a predetermined weight and is for reducing linear weights of the data points that have a large Euclidean norm in the self-expression matrix, and
a second regularization term for the self-expression matrix;
generate, by a similarity generator, a similarity matrix defined by the self-expression matrix that was calculated; and
generate, by a cluster generator, a clustering result by clustering the data set based on the similarity matrix.

8. The clustering device according to claim 2, the processor further configured to execute a method comprising:
generating the self-expression matrix that minimizes the objective function of Formula (3) below, from a predetermined matrix set C,

[Formula 3]

$$Z^* = \mathrm{argmin}_{Z \in C} E[\|F\|^2_F] + \lambda r(Z), \ldots \quad (3)$$

where X is a data matrix whose elements are data points in the data set, Z is the self-expression matrix, $\beta$ is the predetermined weight applied to the first regularization term, $r(Z)$ is the second regularization term, $\lambda$ is a weight applied to the second regularization term, diag (x) is an operator that returns a diagonal matrix having a vector x as diagonal elements, Diag(x) is an operator that extracts diagonal elements of a matrix x to a vector, C is $R^{N \times N}$ or $\{Z | Z \varepsilon R^{N \times N}, Z_{ii}=0\}$, h(*) is the q-th power of Lp norm, and p and q are positive numbers.

9. The clustering method according to claim 5, wherein the self-expression matrix generator generates the self-expression matrix that minimizes the objective function of Formula (4) below, from a predetermined matrix set C,

[Formula 4]

$$Z^* = \mathrm{argmin}_{Z \in C} E[\|F\|^2_F] + \lambda r(Z), \ldots \quad (4)$$

where X is a data matrix whose elements are data points in the data set, Z is the self-expression matrix, $\beta$ is the predetermined weight applied to the first regularization term, $r(Z)$ is the second regularization term, $\lambda$ is a weight applied to the second regularization term, diag (x) is an operator that returns a diagonal matrix having a vector x as diagonal elements, Diag(x) is an operator that extracts diagonal elements of a matrix x to a vector, C is $R^{N \times N}$ or $\{Z | Z \varepsilon R^{N \times N}, Z_{ii}=0\}$, h(*) is the q-th power of Lp norm, and p and q are positive numbers.

10. The computer-readable non-transitory recording medium of claim 7, wherein the first regularization term is expressed using a result of:
obtaining a matrix by calculating a product of a transposed matrix of the data set and a matrix of the data set,
obtaining a vector by applying an operator for extracting diagonal elements of a matrix to a vector to the obtained matrix, and
applying an operator that returns a diagonal matrix having a vector as diagonal elements to the obtained vector.

11. The computer-readable non-transitory recording medium of claim 7,
wherein the self-expression matrix generator generates the self-expression matrix that minimizes the objective function of Formula (5) below, from a predetermined matrix set C,

[Formula 5]

$$Z^* = \mathrm{argmin}_{Z \in C} E[\|F\|^2_F] + \lambda r(Z), \ldots \quad (5)$$

where X is a data matrix whose elements are data points in the data set, Z is the self-expression matrix, β is the predetermined weight applied to the first regularization term, r(Z) is the second regularization term, λ is a weight applied to the second regularization term, diag (x) is an operator that returns a diagonal matrix having a vector x as diagonal elements, Diag(x) is an operator that extracts diagonal elements of a matrix x to a vector, C is $R^{N \times N}$ or $\{Z | Z \varepsilon R^{N \times N}, Z_{ii} = 0\}$, h(*) is the q-th power of Lp norm, and p and q are positive numbers.

12. The clustering device according to claim 1, the processor further configured to execute a method comprising:
receiving the data points in the data set, wherein the data points are associated with digitized image data; and
providing one or more classes of the digitized image data based on the clustered data points.

13. The clustering device according to claim 1, wherein the generating a cluster result further comprises generating the clustering result of the data points using spectral clustering.

14. The clustering device according to claim 1, wherein the second regularization term includes a Frobenium norm $r(Z) = \|Z\|_F$.

15. The clustering method according to claim 5, the method further comprising:
receiving the data points in the data set, wherein the data points are associated with digitized acoustic data; and
providing one or more classes of the digitized acoustic data based on the clustered data points.

16. The clustering method according to claim 5, wherein the cluster generator generates the clustering result of the data points using spectral clustering.

17. The clustering method according to claim 5, wherein the second regularization term includes a Frobenium norm $r(Z) = \|Z\|F$.

18. The computer-readable non-transitory recording medium of claim 7, the computer-executable program instructions when executed further causing the computer system to:
receive the data points in the data set, wherein the data points are associated with digitized voice data; and
provide one or more classes of the digitized voice data based on the clustered data points.

19. The computer-readable non-transitory recording medium of claim 7, wherein the cluster generator generates the clustering result of the data points using spectral clustering.

20. The computer-readable non-transitory recording medium of claim 7, wherein the second regularization term includes a Frobenium norm $r(Z) = \|Z\|_F$.

* * * * *